No. 658,431. Patented Sept. 25, 1900.
C. ENDRUWEIT.
DYNAMO BRUSH.
(Application filed Aug. 7, 1899.)

(No Model.)

WITNESSES
James Mathers
J. Manchester

INVENTOR
Carl Endruweit
BY B. F. Eibler
Attorney.

United States Patent Office.

CARL ENDRUWEIT, OF BERLIN, GERMANY.

DYNAMO-BRUSH.

SPECIFICATION forming part of Letters Patent No. 658,431, dated September 25, 1900.

Application filed August 7, 1899. Serial No. 726,495. (No model.)

*To all whom it may concern:*

Be it known that I, CARL ENDRUWEIT, a subject of the King of Prussia, Emperor of Germany, and a resident of Berlin, Germany, have invented new and useful Improvements in Dynamo-Brushes, (for which I made applications for patent April 3, 1899, in Germany, Austria-Hungary, Belgium, France, Great Britain, Spain, Denmark, Sweden, Norway, Russia, Italy, Switzerland, and Canada,) of which the following is a specification.

My invention consists in the preparation of certain material suitable for commutator-brushes for electric generators and motors; and the object of my improvement is to provide for a material of uniform molecular consistency combining suppleness with elasticity and which in brush or block form effects an even and smooth touch upon the commutator, whereupon "sparking" cannot occur and friction and consequent loss of energy and need of adjustment is reduced to a minimum. I attain this object by preparing such material in the manner as hereinafter described and by compiling said material in brush or block form, as shown in the accompanying drawings, in which—

Figure 1:
Figure 2:
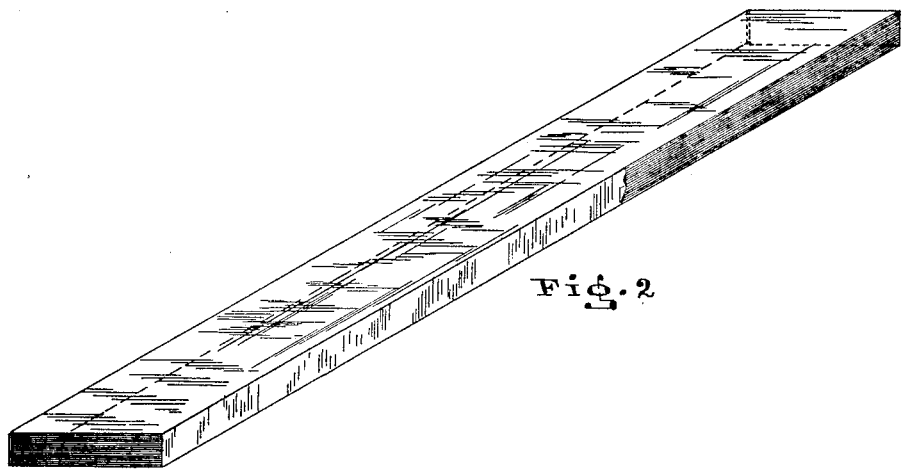

Figure 1 represents a cross-sectional view of a brush or block compiled of leaf material, and Fig. 2 is a perspective view of same.

Brushes possessing the features as above referred to consist of homogeneously-combined metal strips and carbon strips compiled in such manner that metal and carbon appear in alternate layers. For the metallic layers chemically-pure metal sheets or foils are used, and the carbon is obtained from an organic substance, (paper or the like.) Furthermore, the organic substance is saturated or treated in or with a liquid favoring the cohesion with said metal foils and subsequent carbonization of the organic substance, carbonization being effected in a suitable furnace. The thus-obtained homogeneous union of metal and carbon renders the material exceedingly pliant, yet elastic and uniform in wear when compiled and used in the form of brushes upon commutators of dynamos, motors, &c. The polish given to the commutator by the use of such brushes renders the delivery of the current absolutely free of sparks. Consequently no loss is experienced in the transmission of energy from commutator to collector, or vice versa, and, furthermore, when friction is reduced to a minimum then naturally the life of the commutator becomes greatly enhanced and generally there is more reliability and safety in the running of motors or dynamos.

What I claim, and desire to secure by Letters Patent, is—

1. For dynamo-brushes a material prepared of chemically-pure metallic foils and an elastic organic substance, which latter substance is treated with a liquid favoring the cohesion with the metal foil and subsequent carbonization of said organic substance as set forth.

2. A dynamo-brush consisting of homogeneously-united metallic foils and carbon strips, so compiled that metal and carbon appears in alternate layers for the purpose as set forth.

In witness whereof I have hereunto signed my name, this 21st day of April, 1899, in the presence of two subscribing witnesses.

CARL ENDRUWEIT.

Witnesses:
  WOLDEMAR HAUPT,
  HENRY HASPER.